United States Patent [19]
Dao

[11] Patent Number: 5,808,197
[45] Date of Patent: *Sep. 15, 1998

[54] VEHICLE INFORMATION AND CONTROL SYSTEM

[75] Inventor: Ricardo E. Dao, San Diego, Calif.

[73] Assignee: Remec, Inc., San Diego, Calif.

[ * ] Notice: The term of this patent shall not extend beyond the expiration date of Pat. No. 5,581,034.

[21] Appl. No.: 658,110

[22] Filed: Jun. 4, 1996

Related U.S. Application Data

[63] Continuation-in-part of Ser. No. 372,760, Jan. 13, 1995, Pat. No. 5,581,034.

[51] Int. Cl.$^6$ ............................................. G01P 15/12
[52] U.S. Cl. ................... 73/514.09; 280/735; 188/181 A
[58] Field of Search ........................... 73/514.09, 514.03, 73/504.05, 504.06, 504.07, 654; 33/366; 280/735; 188/181 A

[56] References Cited

U.S. PATENT DOCUMENTS

| | | | |
|---|---|---|---|
| 2,440,189 | 4/1948 | Zworykin | 73/514.09 |
| 2,455,394 | 12/1948 | Webber | 73/514.09 |
| 3,084,557 | 4/1963 | Von Ahlefeldt . | |
| 3,241,374 | 3/1966 | Menkis | 73/514.09 |
| 3,500,691 | 3/1970 | Moore . | |
| 3,664,196 | 5/1972 | Codina . | |
| 3,953,080 | 4/1976 | Bremer . | |
| 3,967,178 | 6/1976 | Morris | 73/514.03 |
| 4,522,062 | 6/1985 | Peters . | |
| 4,613,008 | 9/1986 | Hiraiwa et al. . | |
| 4,726,227 | 2/1988 | Moffatt et al. . | |
| 4,797,661 | 1/1989 | Wiley . | |
| 4,823,461 | 4/1989 | Takahashi et al. . | |
| 4,930,349 | 6/1990 | Takahashi et al. . | |
| 4,951,507 | 8/1990 | Takahashi et al. . | |

(List continued on next page.)

FOREIGN PATENT DOCUMENTS

| | | |
|---|---|---|
| 0 674 182 | 6/1995 | European Pat. Off. . |
| 0 664 456 | 7/1995 | European Pat. Off. . |

OTHER PUBLICATIONS

R.P. Sion et al., "The design of a novel accelerometer for automotive applications using thick–film transduction", IMechE 1994.

Issei Ohmura et al., "Development and commericialization of chassis control G–sensors", Int. J. of Vehicle Design, vol. 15, Nos. 3/4/5, 1994, pp. 369–384.

Richard A. Quinnell, EDN Design Feature, "Directionally Dyslexic? Don't Worry: The car knows the way", Dec. 21, 1995, pp. 37–42.

Siemens, "The sensor concept for greater safety" (undated).

P.E. M. Frere, "Problems of Using Accelerometers to Measure Angular Rate in Automobiles", Sensors and Actuators, pp. 821–825, 1991.

*Primary Examiner*—John E. Chapman
*Attorney, Agent, or Firm*—Burns,Doane, Swecker & Mathis, L.L.P.

[57] ABSTRACT

The vehicle control system incorporates an accelerometer which is particularly adapted for use in vehicles due to its readily compensated temperature sensitivity and stable zero g bias. The accelerometer for use in the vehicle control system includes a hermetically sealed enclosure containing a fluid and two temperature sensing elements positioned within the enclosure. When the fluid within the enclosure is heated the convective flow pattern within the enclosure is affected by acceleration of inclination of the enclosure. This change in the convective flow pattern is measured by measuring a temperature difference between the temperature sensing elements to determine the acceleration of the enclosure. The accelerometer provides improved performance over silicon micromachined accelerometers and provides an economical and reliable alternative to other types of accelerometers used in a variety of automotive applications including navigation systems, anti-lock breaking systems, suspension systems, airbag arming, and vehicle tilt sensing applications.

10 Claims, 5 Drawing Sheets

U.S. PATENT DOCUMENTS

| | | |
|---|---|---|
| 5,011,182 | 4/1991 | Husby et al. . |
| 5,012,676 | 5/1991 | Takahashi et al. . |
| 5,193,392 | 3/1993 | Besson et al. . |
| 5,233,873 | 8/1993 | Mozgowiec et al. . |
| 5,235,237 | 8/1993 | Leonhardt . |
| 5,243,861 | 9/1993 | Kloeck et al. . |
| 5,277,064 | 1/1994 | Knigga et al. . |
| 5,303,589 | 4/1994 | Reidemeister et al. . |
| 5,343,748 | 9/1994 | Mozgowiec et al. . |
| 5,368,120 | 11/1994 | Sakai et al. . |
| 5,581,034 | 12/1996 | Dao et al. ............................ 73/514.09 |

VEHICLE INFORMATION AND CONTROL SYSTEM

This is a Continuation-In-Part application of U.S. application Ser. No. 08/372,760, filed on Jan. 13, 1995, now U.S. Pat. No. 5,581,034.

BACKGROUND OF THE INVENTION

1. Field of the Invention

The present invention relates to a vehicle information and control system including at least one accelerometer for providing information about acceleration, deceleration, or tilt of a vehicle. The invention also relates to a method of controlling a vehicle with a system including an accelerometer.

2. Description of the Related Art

With the growth of microprocessor controlled suspension, steering, braking, safety, and navigation systems for vehicles the need has arisen for reliable and inexpensive sensors for use in these systems. Particularly with the growth in active and semi-active suspension systems, anti-lock breaking systems, air bag restraint systems, navigational systems, seat belt restraint systems, vehicle roll-over indication systems, vehicle speedometers, and other automotive control systems, the use of sensors, such as accelerometers, in vehicles is becoming more widespread. Accelerometers are used in the automotive field for sensing of vehicle acceleration in the forward, lateral and vertical directions from which vehicle speed and direction can be calculated, and for sensing vehicle tilt.

In electronically controlled suspension systems, accelerometers are being used to measure vertical vibration velocities of the automobile body and thereby control damping forces at each of the four wheels. Accelerometers are the most convenient form of vibration sensor because they do not require a fixed reference point from which to measure. In electronically controlled suspension systems, an accelerometer positioned at each of the four wheels senses vertical inertial acceleration of the vehicle body and provides an acceleration signal representative of the acceleration to a controller. The controller separately controls a force actuator associated which each wheel in accordance with the acceleration signals. The force actuator may include a hydraulic ram which changes position to restore vehicle "level" in the case of body tilt during an aggressive cornering maneuver.

Microprocessor controlled braking systems including anti-lock braking systems can also use accelerometers to determine vehicle acceleration for use in determining optimal braking. Anti-lock breaking systems use information about wheel deceleration and vehicle speed to determine the amount that the wheel speed deviates from an estimated vehicle speed. This information is used to calculate an anti-lock braking cycle in which the vehicles brakes are released and reapplied to prevent the wheels from sliding in a variety of road conditions.

Accelerometers are also used in supplemental restraint systems to discriminate crash severity and cause a supplemental restraint device such as an airbag or seatbelt pretensioner to activate. Frontal crash discrimination sensors are typically 50 g devices with 2 KHz frequency response. Mechanical switches are typically used in conjunction with the discriminating accelerometer to provide an arming or safing function. This function helps to prevent inadvertent deployment of the supplemental restraint due to electrical noise, system failure, or misuse events such as those experienced in striking a curb or traveling over a rough road. The mechanical switches contain moving parts such as reed contacts, springs and magnets which cause reliability concerns. The present invention overcomes the disadvantages of the mechanical switches and the costliness and susceptibility of the piezoresistive and capacitive accelerometers when used as an arming or safing sensor in airbag applications.

Seat belt restraints may also use accelerometers to sense sudden acceleration or deceleration in order to activate locking of the seat belt retraction mechanism. Other uses for accelerometers in vehicle safety systems include microprocessor controlled four wheel drive and vehicle roll-over or tilt sensing. Current developments in automotive safety have defined a need to predict vehicle roll-over in accidents, to deploy supplemental restraints such as seat belt pretensioners, and to deactivate other vehicle systems such as fuel delivery.

Four wheel drive vehicles may be provided with slip control systems or with automatic two to four wheel drive changeover systems which incorporated accelerometers for determination of vehicle acceleration or deceleration.

Vehicle tilt sensor systems which warn a driver of possible roll-over employ an inclinometer or an accelerometer which is capable of sensing inclination. The inclinometer in vehicle tilt sensing systems is used to activate a light on the dash which warns a driver of excessive tilt angle and lateral acceleration leading to roll-over of the vehicle.

Car navigation systems which are becoming popular, particularly in rental cars, include accelerometers for determining vehicle speed and direction. Many vehicle navigation systems are based on the Global Positioning System (GPS) which uses an arrangement of satellites orbiting the earth to determine the position of a vehicle on the earth. However, GPS alone can only provide a position within an 80 to 150 meter circle centered on the point which has been calculated. This 80 to 150 meter circle may not be sufficient to provide an accurate vehicle location, particularly in a city where tall buildings may obstruct the satellite signals and where streets are close together. Additional information may be provided by a system called a dead reckoning system to supplement GPS in determining location. Dead reckoning systems generally include a series of sensors which determine gear shift position (forward or reverse), vehicle speed, and vehicle direction. Between the GPS position fix, the dead reckoning system, and a map included in the car navigational system software, the vehicle location can be accurately determined. Dead reckoning may also be used in systems without the use of GPS.

Some navigational systems use accelerometers to measure rate of turn of the vehicle for use in determining a change in direction. Accelerometer data must be integrated to determine velocity and direction of the vehicle. This integration of accelerometer output accumulates errors which may occur in the sensors. Double integration of an acceleration output can provide distance information with an additional accumulation of errors. Errors in accelerometer output may occur, for example, when a vehicle is riding uphill, downhill, or on a road which is crowned. Additional errors can be caused by changes in temperature. Therefore, for use in navigation systems and other vehicle control systems where accelerometer output is integrated an accelerometer with improved accuracy and minimal temperature sensitivity is desirable.

Many of the accelerometers which are currently available for use in vehicle systems such as electronically controlled suspensions, braking, safety, and navigation systems are quite expensive and often require complex signal conditioning arrangements. Accelerometers which are available for use in vehicle control systems include piezoelectric, piezoresistive, force balanced, and capacitive accelerometers.

Piezoelectric accelerometers include a piezoelectric or crystalline material which generates an emf in response to acceleration. These accelerometers are useful primarily in measuring vibration. Piezoelectric accelerometers may be used to measure vibration in vehicle suspension systems. However, these piezoelectric accelerometers require the provision of special signal conditioning arrangements including a charge amplifier. Piezoelectric accelerometers are also sensitive to environmental temperature changes. Examples of piezoelectric accelerometers are disclosed in U.S. Pat. Nos. 5,235,237 and 5,193,392. Other accelerometers which may be used in electronically controlled suspension systems, and other automotive systems include micromachined silicon piezoresistive accelerometers and capacitive accelerometers.

Piezoresistive accelerometers include mechanical structures which generate strain in critical locations due to acceleration. The acceleration is measured by placing piezoresistors in the locations where strain occurs to generate electric signals corresponding to the acceleration. An example of a piezoresistive accelerometer is disclosed in U.S. Pat. No. 5,277,064. However, piezoresistive accelerometers have the disadvantage that they are particularly sensitive to environmental temperature changes. Conventional piezoresistive accelerometers include a silicon mass which is movable in a silicon body. When these silicon piezoresistive accelerometers are used in automotive environments, the silicon of the accelerometers and the materials used in electrically connecting the accelerometers to an automotive circuit exhibit substantially different thermal coefficients of expansion. Accordingly, when the materials are subjected to the varying temperatures likely to be encountered by an automobile, the accelerometer tends to be subjected to strain due to the differing thermal expansion coefficients so that the accuracy of the accelerometer output is adversely affected. In addition, two piezoresistive accelerometers are required to provide biaxial sensing capabilities which is costly. Piezoresistive accelerometers are also susceptible to electromagnetic noise interference and to the discharge of static electricity.

Force balanced or servo accelerometers include a mass which is spring-suspended between two permanent magnets. A displacement of the mass due to acceleration is sensed by a capacitive or other probe. A signal from the probe is amplified and the resulting current passes through a coil wound on the mass, producing a rebalancing force that restores the mass to its original position. Force balanced or servo accelerometers provide high sensitivity and precision, but at a very high cost. In addition, two such devices would be required to provide biaxial sensing capabilities which is costly. An example of a servo accelerometer is disclosed in U.S. Pat. No. 3,664,196.

Capacitive accelerometers include parallel plates which move closer together in response to acceleration. The capacitance between the parallel plates can be measured with electronics. A capacitive accelerometer can be made in a relatively small size. However, as the capacitive accelerometer is made smaller, the size of the electronics required to sense and measure the small output increases. Although capacitive accelerometers can be used in vehicle control systems such as suspension systems, the costs of tooling-up to make capacitive accelerometers are higher than piezoelectric and piezoresistive devices, making them a less desirable and more expensive alternative. Additionally, they are susceptible to electrostatic discharge and electromagnetic interference due to the high impedance of the devices. Two capacitive die or "beams" would be required to provide biaxial sensing capabilities which is costly. Alternatively, monolithic structures including biaxial capability can be surface micro machined but at reduced production efficiency and yields. Examples of capacitive accelerometers are disclosed in U.S. Pat. Nos. 5,303,589 and 5,243,861.

SUMMARY OF THE INVENTION

The present invention relates to control systems for vehicles employing an improved accelerometer. The accelerometer used in the present invention is less sensitive to temperature fluctuations than piezoresistive accelerometers and has a simple structure which makes it less expensive than other types of accelerometers. Additionally the proposed accelerometer is less sensitive to electrostatic discharge and has greater noise immunity due to its lower impedance.

A preferred embodiment of the present invention relates to a vehicle information system for providing information about acceleration or tilt of an automobile including an enclosure containing a fluid mounted on a vehicle body, heating means for heating the fluid in the enclosure, two temperature sensing elements positioned within the enclosure such that the fluid moves across the two temperature sensing elements providing first output signals which are representative of the respective temperatures of the two temperature sensing elements, and circuit means for receiving the first output signals and providing an accelerometer output signal representative of the acceleration or tilt of the vehicle.

According to another aspect of the present invention, a method of controlling a vehicle includes mounting an accelerometer in a vehicle, the accelerometer including an enclosure containing a fluid, and temperature sensing elements within the enclosure, sensing a temperature difference between the temperature sensing elements within the enclosure cause by changes in free convention of the fluid within the enclosure due to acceleration or inclination, determining an acceleration or inclination of the vehicle based on the sensed temperature difference, and controlling a vehicle control or sensing system in accordance with the sensed acceleration.

According to a further aspect of the present invention, a method of producing an accelerometer for use in a vehicle includes mounting a temperature sensing element on a body, applying a current to the temperature sensing element in the oxidizing atmosphere to cause oxidation of the temperature sensing element, and precisely controlling the resistance of the temperature sensing element by removing the current when a desired resistance is achieved.

BRIEF DESCRIPTION OF THE DRAWING FIGURES

The invention will be described in greater detail with reference to the accompanying drawings in which like elements bear like reference numerals, and wherein.

DETAILED DESCRIPTION

The vehicle control system according the present invention incorporates an accelerometer which is particularly adapted for use in vehicles due to its readily compensated temperature sensitivity and stable zero g bias. The accelerometer according to the present invention provides improved performance over silicon micromachined accelerometers and provides an economical and reliable alternative to other types of accelerometers and mechanical switches such as those used in airbag arming applications.

Figure 1:
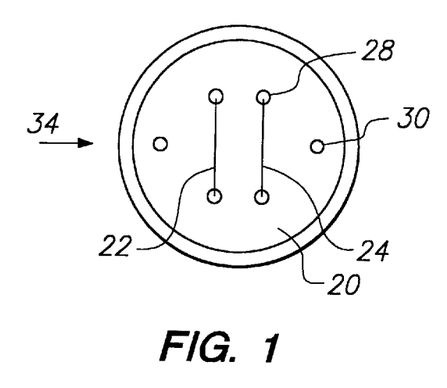
FIG. 1 is top view of an accelerometer for use in the a vehicle control system according to the present invention.
Figure 2:
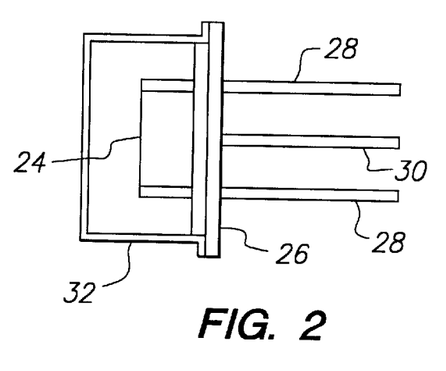
FIG. 2 is a side view of the accelerometer of FIG. 1.

One embodiment of the accelerometer for use in the vehicle control system according to the present invention is illustrated in FIGS. 1 and 2. The accelerometer includes a hermetically sealed enclosure 20 containing a gas and two temperature sensing elements 22, 24 positioned within the enclosure. In the embodiment shown in FIGS. 1 and 2, the enclosure 10 includes a header assembly 26 which is provided with a plurality of posts 28 extending through the header assembly for use as electrical contacts. As shown in FIG. 2, four of the posts 28 serve as mounting means for the temperature sensing elements 22, 24. Two additional posts 30 are used to provide a ground. The ground posts 30 also provide additional mechanical support for the accelerometer when it is mounted within the control device. The posts 28, 30 are preferably positioned within the header assembly 26 in a symmetrical configuration so that heating of the temperature sensing elements occurs 22, 24 symmetrically.

The enclosure 20 is filled with a fluid and provided with a cover 32, which is configured to engage the header assembly 26 with a tight fit and is hermetically sealed to the header assembly to prevent any of the fluid from escaping. The hermetic seal may be formed by any known technique for forming a leak proof seal including eutectic soldering, projection welding, laser welding, resistance welding or cold welding. The enclosure 20 is preferably formed of metal, such as Kovar. However, other materials such as glass, plastic, ceramic or other glass to metal sealing alloys may also be used. The preferred enclosure 20 is a T8 can which is available from Schott Glaswerke part numbers SL 08.039 and SL 04.245, respectively. Other suitable parts for the header assembly 26 and the cover 32 of the accelerometer are AIRPAX A08-616-002 and REMEC A500200-330, respectively. Although a separate header assembly 26 and cover 32 are shown in the figures, the enclosure can be formed as a single piece such as a glass bulb. Alternatively, a ceramic surface mount package may be used.

The accelerometer includes a sealed chamber for containing the fluid and protecting the fluid from outside forces or disturbances so that the fluid is free to move only by natural convection and is not affected by forced convection due to outside sources. The natural convection within the enclosure is altered or changed only by movement of the entire enclosure, thus providing the acceleration sensing.

Free or natural convention is the transfer of heat by the flow of a fluid subject to a heat source. A fluid which is subject to a heat source will flow in a predictable convective flow pattern. This convective flow pattern is affected by acceleration and this effect of acceleration on the convective flow pattern can be measured to determine the acceleration of the enclosure.

When temperature sensing elements 22, 24 of the embodiment of FIGS. 1 and 2 are provided with electric current, the resistances of the elements cause the temperature of the elements to rise. The fluid within the enclosure 20 which is adjacent to the elements 22, 24 is heated by the elements and the fluid rises within the enclosure due to the buoyant forces of heated and thereby lower density fluid. The flow pattern of a fluid in free convection in a stationary system is shown in FIG. 10.

Figure 10:
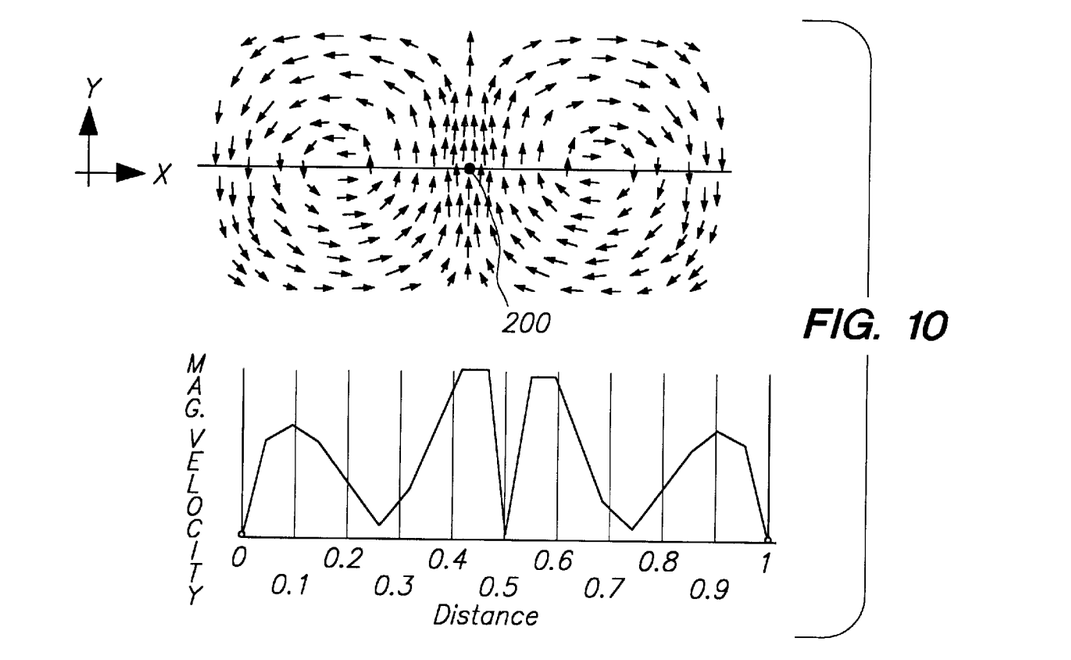
FIG. 10 is a fluid flow model of the fluid flow from buoyant forces in a stationary system.

The source of heat in the model of FIG. 10 is a hot wire 200, such as one of the temperature sensing elements 22, 24, located in the center of the figure which extends into the paper. In the flow pattern shown in FIG. 10, the fluid heated by the hot wire 200 expands and rises to the top of the enclosure. The cooler and thereby more dense fluid falls to the bottom of the enclosure due to the force of gravity. As can be seen from FIG. 10, the flow pattern of the fluid is symmetrical about a vertical plane through the heat source 200. The lower part of FIG. 10 shows the magnitude of the velocity of the fluid as a function of the normalized distance along the X axis.

The temperature profile of a fluid in free convection in a stationary system is symmetrical about the vertical plane through the heat source. Therefore, temperature sensing elements 22, 24 which are heated equally and positioned symmetrically about a vertical plane through the center of the enclosure 20 will register the same temperature when the accelerometer is not subject to acceleration.

Figure 11:
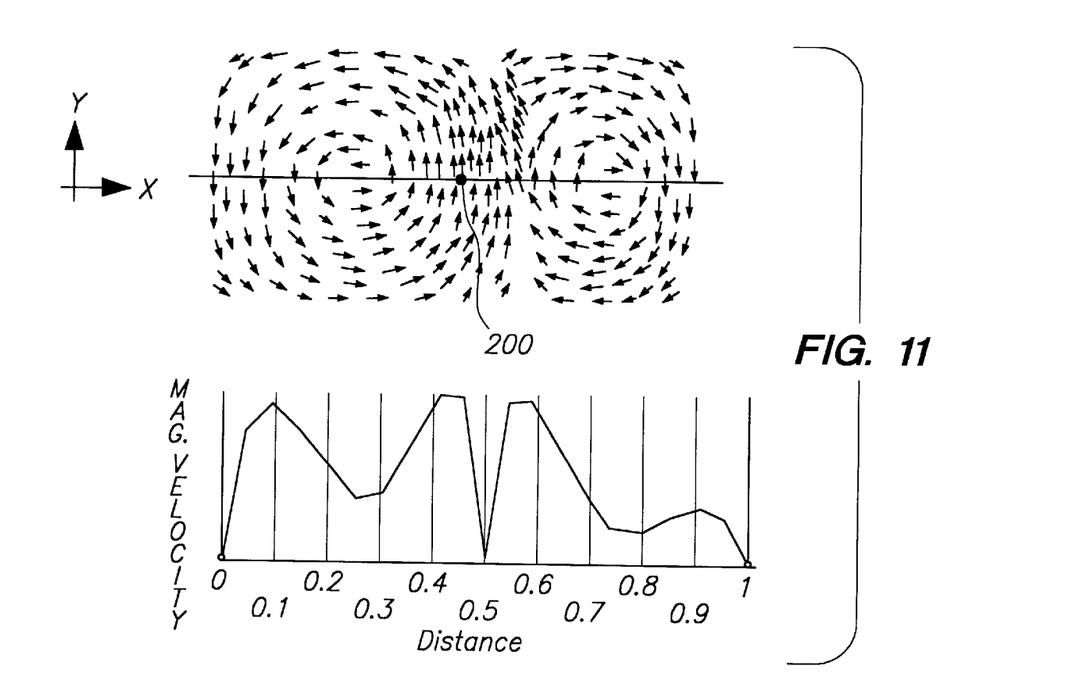
FIG. 11 is a fluid flow model of the fluid flow in a system which is accelerated at 1 g in the X direction.

When the accelerometer is subject to acceleration the convective flow pattern of the gas within the enclosure 20 changes. FIG. 11 shows the convective flow pattern of a fluid which is subject to gravity and to an acceleration of 1 g applied in the X direction (to the right in the figure). The convective flow of the fluid is distorted due to the acceleration so that more of the fluid heated by the central heat source 200 flows to the left in FIG. 11. The lower part of FIG. 11 shows the magnitude of the velocity of the fluid as a function of the normalized distance along the X axis.

When the enclosure 20 is subjected to acceleration, temperature sensing elements 22, 24 which are positioned symmetrically about the vertical plane through the center of the enclosure 20 will be heated differently. The temperature difference between the temperature sensing elements 22, 24 depends on the magnitude of the acceleration. Although the examples shown in FIGS. 10 and 11 include the effects of the force of gravity, it should be understood that the device is sensitive to acceleration even in the absence of gravitational force.

The accelerometer of FIGS. 1 and 2 has an acceleration sensitive axis which is generally perpendicular to and in the same plane as the temperature sensing elements 22, 24. When the accelerometer is accelerated along the acceleration sensitive axis, in the direction of the arrow 34, the convective flow of the fluid within the enclosure 20 is affected as described above with reference to FIG. 11. The pattern of convection is skewed due to the acceleration so that the amount of heat transfer to the first temperature sensing element 22 is increased and the amount of heat transfer to the second temperature sensing element 24 is decreased.

Therefore, when the accelerometer of FIG. 1 is subject to acceleration in the direction of the arrow 34, the temperature of the temperature sensing element 22 will be higher than the temperature of the temperature sensing element 24. This difference in temperature between the first and second temperature sensing elements is used to determine the acceleration along the acceleration sensitive axis. Since changes in temperature cause corresponding changes in electrical resistance, the temperature difference between the sensing elements can be easily measured by an electrical circuit such as a Wheatstone bridge.

The accelerometer can also measure inclinations by measuring the acceleration due to gravity. This inclination measuring function is particularly useful in vehicle tilt sensors in which the accelerometer output provides a warning of excessive tilt to the driver of the vehicle. When the accelerometer of FIGS. 1 and 2 is mounted on a vehicle with the sensing elements 22, 24 horizontal, the inclination angle B of the vehicle can be calculated by the following formula:

$$B \approx \sin^{-1} V_{out}$$

where $V_{out}$ is the output of the accelerometer, B is the angle of inclination about an axis which is parallel to the temperature sensing elements, and the accelerometer output has been electronically calibrated so that 1 volt represents 1 g of acceleration.

When the accelerometer of FIGS. 1 and 2 is mounted on a vehicle with the temperature sensing elements 22, 24 positioned vertical, the inclination angle B can be calculated by the following formula:

$$B \approx \cos^{-1} V_{out}$$

where $V_{out}$ is the output of the accelerometer, B is the angle of inclination about an axis which is parallel to the temperature sensing elements, and the accelerometer output has been electronically calibrated so that 1 volt represents 1 g acceleration.

Accelerations or inclinations in all directions other than 90° to the acceleration sensitive axis will have a component along the acceleration sensitive axis which can be measured by the accelerometer of FIGS. 1 and 2. An acceleration which is applied at 90° to the acceleration sensitive axis will cause an equal change in temperature for each of the two temperature sensing elements 22, 24. Therefore, the difference in temperature between the temperature sensing elements 22, 24 will be zero for acceleration at 90° to the acceleration sensitive axis. Therefore, in order to sense acceleration in two or three directions in the present invention, more than one accelerometer is provided and positioned perpendicularly.

The temperature sensing elements 22, 24 are preferably positioned near the center of the enclosure 20 at approximately an equal distance from the cover 32 and the header assembly 26 in order to minimize the effects of external temperature changes on the internal temperature of the fluid and the elements. The temperature sensing elements 22, 24 are preferably positioned at a sufficient distance from the walls of the cover 32 so that appreciable heat is not lost to the enclosure before the fluid flow reaches the sensor elements.

Additional containing of the enclosure 20 can also be provided to isolate the fluid and the temperature sensing elements from localized external temperature changes. Temperature isolation may be achieved by providing a second enclosure or casing surrounding the enclosure 20. A fluid such as air provided between the enclosure 20 and the second enclosure or casing would minimize uneven heating or cooling of the enclosure 20. Alternatively, a heat sink may be provided, for example, on the header assembly 26, and the remainder of the enclosure may be insulated. The combination of a heat sink and insulation will effectively isolate the enclosure from the effects of localized external temperature changes.

The temperature sensing elements 22, 24 are preferably of a sufficient length and a small enough diameter so that free convection within the enclosure prevails over conduction of heat through the posts 28, 30. Temperature sensing elements having high aspect ratios (length/diameter) are desirable to assure that heat transfer by convection prevails over heat transfer by conduction of heat through the mounting posts. For example, nickel or tungsten temperature sensing elements of 0.3 inches in length and 0.0003 inches in diameter are acceptable.

The temperature sensing elements 22, 24 are preferably made of a metal having a relatively high temperature coefficient of resistivity because such metals provide higher sensitivity. Linear temperature coefficients of resistivity in the range of −55° C. to 200° C. are desirable for the temperature sensing elements. Suitable metals for the temperature sensing elements include nickel, platinum and tungsten. However, it should be understood that other pure metals and alloys having similar characteristics can also be used.

The temperature sensing elements 22, 24 are shown in FIGS. 1 and 2 as linear wires which are positioned parallel to each other within the enclosure. However, other shapes and variations of the temperature sensing elements are within the scope of the present invention. Particularly, curved or arc shaped sensing elements may better conform the accelerometer output to a linear mathematical function which provides for simplicity of interface. Additionally, coiled temperature sensing elements may be used in place of linear wires.

The frequency response of the accelerometer is affected by the molecular weight of the gas within the enclosure 20. Gases which have higher molecular weights, such as nitrogen, argon, xenon, neon, krypton or atmospheric air and mixtures of these are preferred because they provide for greater temperature difference between the temperature sensing elements 22, 24 for the same heat input power. Helium, which has a lower molecular weight than the gases listed above, will increase the frequency response of the accelerometer by an order of magnitude over the frequency response of an accelerometer using nitrogen. However, the low molecular weight of helium will make an accelerometer more sensitive to localized temperature changes in the environment surrounding the exterior of the enclosure and will require more heater power. Therefore, low molecular weight gases are undesirable for use in vehicle control systems. There is a trade-off between frequency response and sensitivity to localized environmental temperature changes, and there is also a trade-off between frequency response and heater power required.

The choice of a particular inert gas or mixture of gases will depend on the frequency response and sensitivity required for the control device, and the power available. The use of inert gases is preferred over non-inert gases because non-inert gases may cause the temperature sensing elements to break down or age more quickly. Non-inert gases such as air and non-hermetic enclosures may be used as well.

The frequency response characteristics of the accelerometer output may also be varied by varying the pressure of the gas within the enclosure. When the pressure within the enclosure is varied, the accelerometer will exhibit a different frequency response, however, as has already been described, there will be a trade-off between the frequency response, the sensitivity of the accelerometer to external localized temperature changes and heater input power.

Figure 7:
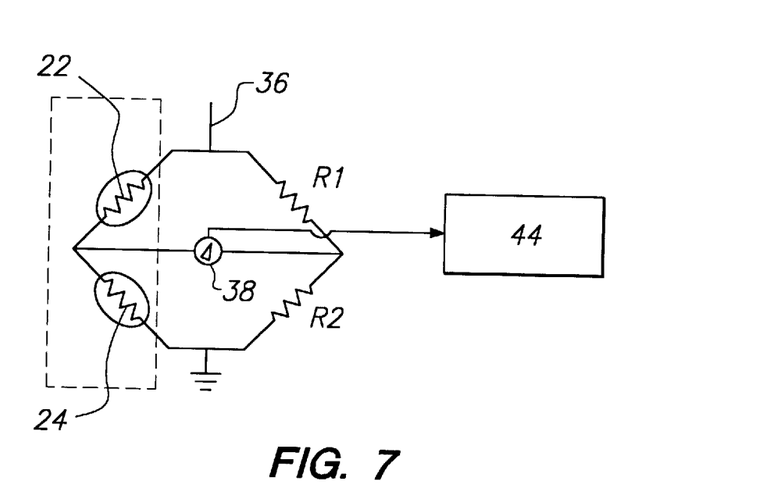
FIG. 7 is a circuit diagram of a resistance determining circuit according to one embodiment of the present invention.

FIG. 7 is an electrical diagram of a basic circuit which may be used to determine the difference in temperature between the two temperature sensing elements 22, 24. The circuit of FIG. 7 determines the difference in the resistances of the two temperature sensing elements 22, 24 by a Wheatstone bridge. The bridge includes a power lead 36, two known resistances R1, R2, and a voltage meter 38 which measures the voltage output. In operation, electrical power is supplied from the power lead 36 through the temperature sensing elements 22, 24 and also through the two known resistors R1, R2. The voltage difference across the Wheatstone bridge from between the two temperature sensing elements 22, 24 to between the two known resistors R1, R2 is measured by the voltage meter 38. The output of the voltage meter 38 depends upon the acceleration of the device. The circuit of FIG. 7 may be positioned either inside the enclosure or outside of the enclosure. The output of the voltage meter 38 is transmitted to a vehicle control processing circuit 44 for use in controlling one of the vehicle control systems discussed below.

Figure 8:
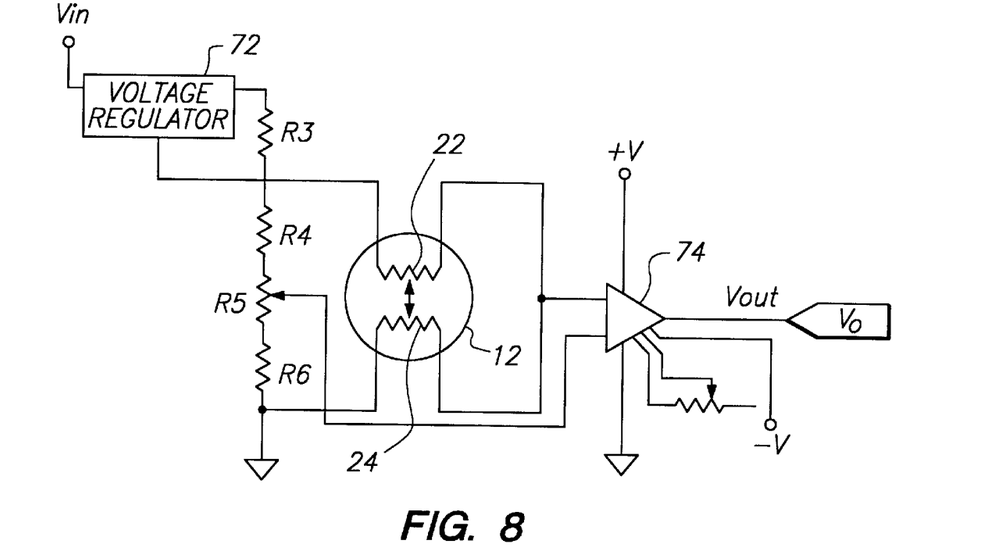
FIG. 8 is a circuit diagram of an acceleration determining circuit including signal conditioning electronics.

FIG. 8 is circuit diagram of a circuit used for determining acceleration from the accelerometer of FIGS. 1 and 2 which includes signal conditioning. In the circuit of FIG. 8, a constant dc voltage $V_{in}$ is applied to a voltage regulator 72 which provides a constant current source to the temperature sensing elements 22, 24 of the accelerometer 12. The constant current is applied to the first of the temperature sensing elements 22 and is applied through a series of known resistors R3, R4, R5, and R6 to the other of the temperature sensing elements 24. The resistor R5 is a trim pot, the resistance of which may be varied to balance the bridge. Balancing of the bridge is needed when the two temperature sensing elements 22, 24 are not perfectly matched in resistance so that the output is not adversely influenced by the difference in resistance of the sensing elements. The resistances of the resistors R3, R4, R5, and R6 are selected to achieve sensitivity compensation for a particular accelerometer configuration. For the configuration of the accelerometer shown in FIGS. 1 and 2 resistors R3, R4, R5, and R6 having resistances of 60, 100, 50, and 100 ohms, respectively, are acceptable. A voltage between the two temperature sensing wires 22, 24 is compared to the voltage between the two resistances R3 and R5 at the trim pot R4 to determine $V_{out}$ which represents the acceleration or inclination of the accelerometer.

The use of the constant current source provided by the voltage regulator 72 provides self temperature compensation, thus, eliminating the need to provide complicated temperature compensation circuitry. A variable amplification amplifier 74 is provided which allows the output $V_{out}$ to be amplified to a desired amplified output voltage needed for a particular application.

Figure 12:
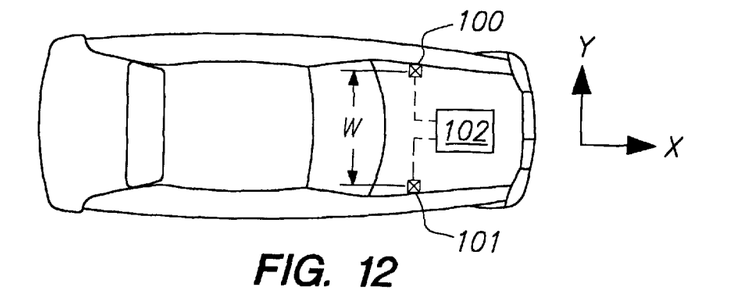
FIG. 12 is a top view of a car according to the present invention.

As shown in FIG. 12, a vehicle control processing circuit 12 receives the output from one or more accelerometers 100, 101, and uses this information for control of a system of the vehicle. The circuits shown in FIGS. 7 and 8 for determining accelerometer output may be provided on the accelerometers 100, 101 or in the processing circuit 102. The vehicle systems which may be controlled by the processing circuit 102 include a navigation system, an anti-lock braking system, a suspension system, an air-bag restraint system, a seat belt restraint system, and a vehicle roll-over indication system.

The use of the accelerometer according to the present invention in vehicle control systems provides advantages over the known accelerometers because the accelerometer according to the invention is less sensitive to environmental temperature changes. The accelerometer according to the present invention may be mounted on a vehicle at a position and orientation which will depend on the vehicle system which will be controlled. For suspension and braking systems, accelerometers are preferably positioned near each of the wheels. While for activation of air-bags or seat belts a single accelerometer may be positioned with its acceleration sensitive axis parallel to the direction of travel of the vehicle. Accelerometers for roll-over sensing systems are positioned with the acceleration sensitive axis perpendicular to the direction of travel.

Navigation systems are generally installed in a vehicle dash and contain one or more accelerometers within the navigation system. For sensing of rate of turn of a vehicle for use in determining direction of travel and location, two of the accelerometers shown in FIGS. 1 and 2 are mounted perpendicular to one another. Alternatively, a biaxial embodiment of the accelerometer illustrated in FIGS. 3 and 4 may be used in navigation systems to sense acceleration in two dimensions.

In order to determine acceleration of a vehicle in two dimensions for use in vehicle control systems, two accelerometers of the type shown in FIGS. 1 and 2 are mounted on the vehicle with their acceleration sensitive axes perpendicular to one another.

Figure 3:
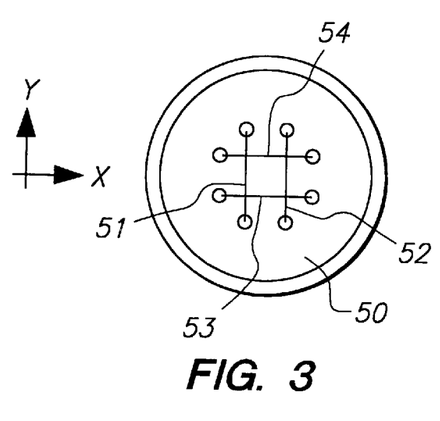
FIG. 3 is a top view of a second embodiment of the accelerometer for use in the present invention.
Figure 4:
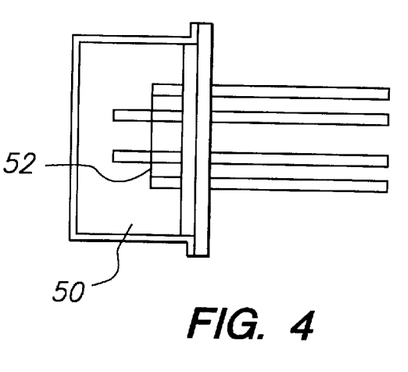
FIG. 4 is a side view of the accelerometer of FIG. 3.

The biaxial embodiment of the accelerometer for use in the vehicle control device of the present invention, shown in FIGS. 3 and 4, is configured to sense acceleration or inclination in two dimensions. This embodiment is provided with an enclosure 50 containing four temperature sensing elements 51–54 for sensing acceleration along two acceleration sensitive axes, the X and Y axes. The temperature sensing elements are positioned with two parallel temperature sensing elements 51, 52, and two additional parallel temperature sensing elements 53, 54 which are positioned above and perpendicular to the elements 51, 52. This four wire embodiment may be heated by the temperature sensitive elements themselves or may be provided with a separate heating element positioned centrally within the enclosure 50. This four wire accelerometer of FIGS. 3 and 4 provides the same result as mounting two of the accelerometers shown in FIGS. 1 and 2 with acceleration sensitive axes perpendicular to each other.

Figure 9:
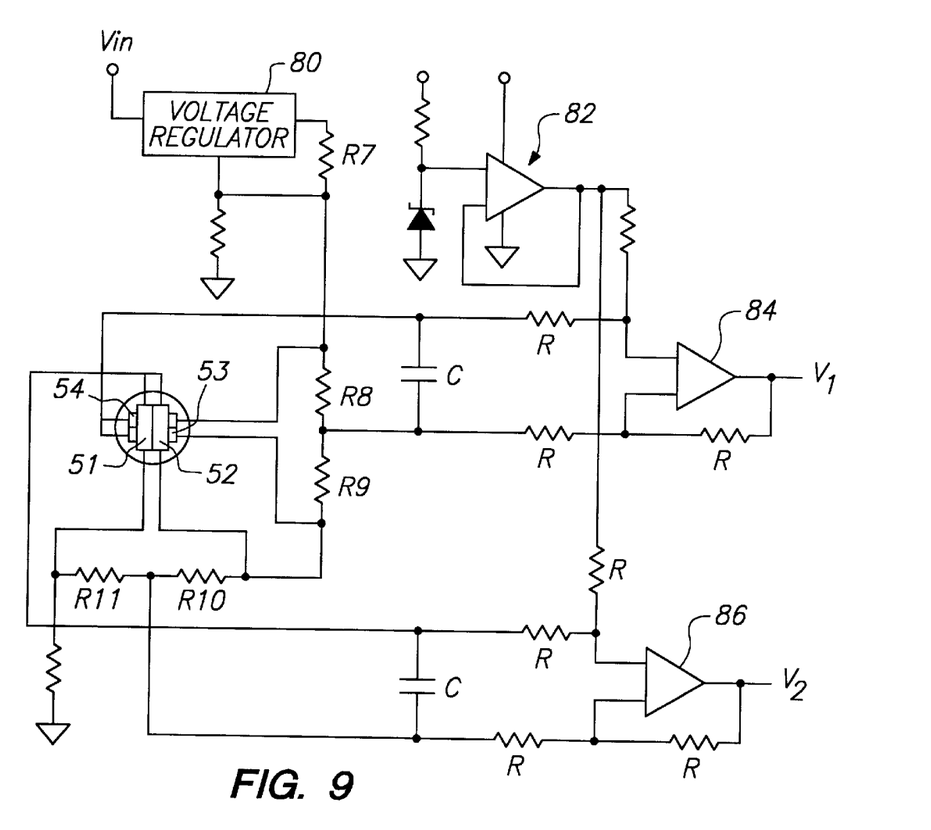
FIG. 9 is a circuit diagram of an acceleration determining circuit for use with the biaxial accelerometer of FIGS. 3 and 4.

A circuit diagram of a circuit for use in determining acceleration in two directions is shown in FIG. 9. This circuit may be used with the accelerometer of FIGS. 3 and 4 which is capable of sensing acceleration in two directions, or may be used with two of the accelerometers of FIGS. 1 and 2. In the circuit of FIG. 9, a voltage regulator 80 provides a constant current source through resistors R7, R8, R9, R10, and R11 to each of the temperature sensing elements 51–54 which are connected in series. The use of the signal conditioning circuit of FIG. 9 conserves power over the use of two of the circuits of FIG. 8 because the temperature sensing elements are connected in series. Additional resistors R and capacitors C connect the temperature sensing elements to comparators 84, 86. The circuit of FIG. 9 provides comparator outputs $V_1$ and $V_2$ which represent the acceleration or inclination along the two temperature sensitive axes of the biaxial accelerometer.

An amplifier 82 is provided which allows a zero point of the output to be offset. The zero point is the output voltage achieved for zero acceleration and zero inclination. In some instances it is desirable to offset the zero point from zero, in particular, for applications which are responsive to only a limited range of output voltages. For example, in an application which can receive output voltages of the accelerometer only in the 0 to 5 volt range, negative accelerations could not be sensed by the application. However, if the zero point is offset to 2.5 volts by the amplifier 82, accelerations in both the positive and negative directions can be sensed.

When the accelerometer of FIGS. 3 and 4 is used as an inclinometer in vehicle, the inclinations of the vehicle in two dimensions are determined by the following formulas. When the accelerometer of FIGS. 3 and 4 is mounted on the vehicle with both pairs of temperature sensitive elements horizontal, the inclinations $B_1$ and $B_2$ are:

$$B_1 \approx \sin^{-1} V_1 \text{ and } B_2 \approx \sin^{-1} V_2$$

where $B_1$ is the inclination about an axis parallel to the first pair of temperature sensing elements which produce the output voltage of $V_1$, and $B_2$ is the inclination about an axis parallel to the second pair of temperature sensing elements which produce an output of $V_2$.

When the accelerometer of FIGS. 3 and 4 is mounted on the vehicle with a first pair of temperature sensing elements vertical and a second pair of temperature sensing elements horizontal, the inclinations $B_1$ and $B_2$ are:

$$B_1 \approx \cos^{-1} (V_1/\cos(\sin^{-1} V_2)) \text{ and}$$

$$B_2 \approx \sin^{-1} V_2$$

where $B_1$ is the inclination about an axis parallel to the first pair of vertical temperature sensing elements which produce an output voltage of $V_1$, and $B_2$ is the inclination about an axis parallel to the second pair of horizontal temperature sensing elements which produce an output of $V_2$. These inclinations may be implemented with polynomials or look up tables depending on the particular microprocessor employed. Applications for biaxial inclination sensing may include tilt sensing about two axes for roll-over systems and biaxial tilt/lateral acceleration for suspension control.

Accelerometers are not commonly used for measuring rate of rotation of a vehicle for the purpose of predicting vehicle direction in navigation systems. The common approach for determining heading from acceleration would require the integration of the acceleration to determine a rate of rotation, and integration of this rate to determine a change in angle from an initial heading. The signal resulting from this double integration is greatly reduced in strength from the original accelerometer output and any errors which may occur are multiplied by the integration.

According to a preferred embodiment of the invention, the navigational system includes a pair of accelerometers 100, 101 which are positioned as shown in FIG. 12, spaced a distance W apart. The two accelerometers will provide a rate of turn output which is equivalent to the output of a rate gyro. The rate of turn is defined by the relationship:

$$\frac{\delta \Theta}{\delta t} = \sqrt{\frac{\Delta A}{W}}$$

wherein $\delta\Theta/\delta t$ is the rate of turn in radians per second, $\Delta A$ is the difference in accelerations of the two accelerometers 100, 101, and W is the distance of separation between the accelerometers.

The advantages provided by a vehicle navigation system including two spaced apart accelerometers are that the system outputs data as a rate gyro without any supporting sensor information, and that the two accelerometers cancel out any non-turn G loads, such as vibration or roll due to a non-level driving surface.

The separation W of the two accelerometers 110, 101, is preferably greater than two feet apart, and more preferably greater than four feet apart. The more well matched the two accelerometers 100, 101 are, the better the cancellation of the effects of non-turn G loads will be.

The accelerometer of FIGS. 1 and 2, when mounted in a vehicle perpendicular to the direction of travel, which is used to measure vehicle acceleration may in turn be used to calculate and indicate vehicle speed. The accelerometer of the present invention offers a significant improvement over other accelerometers in that the present invention has a very stable zero acceleration bias and a very high degree of resolution, both of which are critical to accelerometers used in speedometer applications.

Figure 5:
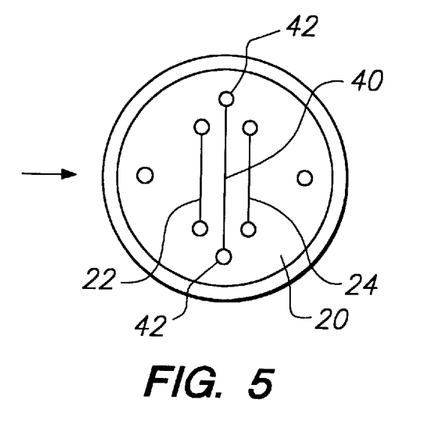
FIG. 5 is a top view of a third embodiment of the accelerometer for use in the present invention.
Figure 6:
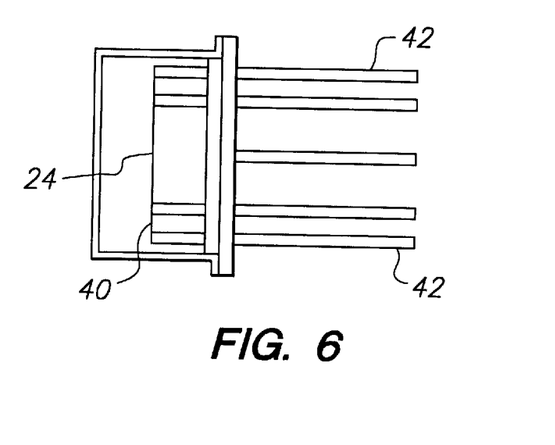
FIG. 6 is a side view of the accelerometer of FIG. 5.

A third embodiment of the accelerometer for use in the present invention is shown in FIGS. 5 and 6. In this embodiment a heating element 40 is provided between the two temperature sensing elements 22, 24. The heating element 40 is positioned centrally within the enclosure 20 so as to provide even heating of the two temperature sensing elements when the enclosure is stationary.

The heating element 40 is mounted on posts 42 and is preferably formed of the same material as the temperature sensing elements, however, it may also be formed of a different material than the temperature sensing elements 22, 24. For example, the heating element may be formed of a material with a higher resistance than the temperature sensing elements. Metal heating elements similar to those metals used for the temperature sensing elements with relatively high temperature coefficients of resistivity are desirable because they provide a self compensation of scale factor verse temperature.

The heating element 40, as shown in FIGS. 5 and 6 is preferably located symmetrically at an equal distance from both of the temperature sensing elements 22, 24 so that when the accelerometer is not subject to acceleration or inclination heating of the two temperature sensing sensor elements due to convection is equal. An asymmetrically located heating configuration may also be used, however, the output of such an asymmetrically located heated configuration accelerometer will have an offset that changes versus environmental temperature. In addition, the heating of the fluid may be provided by an element other than a wire such as a point source or a coil. Alternatively, two or more heating elements may be used.

The location of the temperature sensing elements 22, 24 with respect to the heating element 40 will affect the frequency response of the accelerometer, i.e., the speed at which the device registers a change in acceleration. Where a higher frequency response is necessary, the temperature sensing elements 22, 24 may be moved closer to the heating element 40 to provide quicker convection of heat from the heating element to the temperature sensing elements. Element spacing, layout, geometry and position are used to control the temperature of the elements, and therefore, the output of the accelerometer. The package size of the accelerometer according to all of the forgoing embodiments can be as small as current miniature electronic component packages, such as, surface mount components.

Alternatively, the temperature sensing elements may be formed using currently standard processes used to make silicon micro-machines such as surface micromachining wherein layers formed on a silicon substrate are preferentially etched to create sensor element structures. Signal conditioning and transmitting means may be combined inside the same package on the same substrate if desired using these techniques.

The output signal $V_{out}$ of any of the above described embodiments of accelerometers may require output signal conditioning to interface with and enhance the performance of the accelerometers. Interface signal conditioning can be used to amplify or diminish the accelerometer output to a voltage required by the particular application electronics. When the accelerometer according to the embodiment of FIGS. 1 and 2, using nitrogen at 1 atm., is accelerated at a rate of about 1 g and is provided with an input voltage of about 4 volts at 25° C., the output, $V_{out}$, detected by the voltage meter 38 is about 40 millivolts. Depending on the particular application, an output of 40 millivolts may be insufficient and require amplification by an electronic amplifier or other scale factor circuitry. The 40 millivolt output of the example above described may be amplified to typically between 1 and 10 volts depending on the application.

Signal conditioning may also be used to improve the temperature stability of the accelerometer by compensating for environmental temperature changes. Various temperature compensation circuits are known to those in the art and would be acceptable for compensating for environmental temperature changes in the present invention. An alternate method for reducing the accelerometer sensitivity to external temperature is to employ a constant temperature heater, either external to the accelerometer enclosure 10 or within the accelerometer enclosure itself. The heater keeps the enclosure at a constant temperature and thereby minimizes the effect of environmental temperature changes.

Frequency response compensation circuits may also be used depending on the application, to extend the frequency response of the accelerometer. For example, the frequency response of a nitrogen accelerometer may be extended to the frequency response of a helium accelerometer by a frequency response compensation circuit. The signal conditioning, including frequency response enhancement, may be packaged inside the same package as the accelerometer and be in the form of an ASIC or other miniaturized semiconductor device.

The performance of the accelerometer according to each of the embodiments of the present invention can be improved by matching the resistances in the temperature sensing elements. The temperature sensing elements according to the present invention may have resistances which vary slightly due to differences in the wires themselves or in the mounting of the wires within the enclosure. The temperature sensing elements may be matched by the following procedure which subjects the elements to oxidation to increase the resistances of the temperature sensing elements to a specific desired resistance. The matching of the resistances of the temperature sensing elements improves the performance of the accelerometer and improves consistency between accelerometers which are mass produced.

Figure 13:
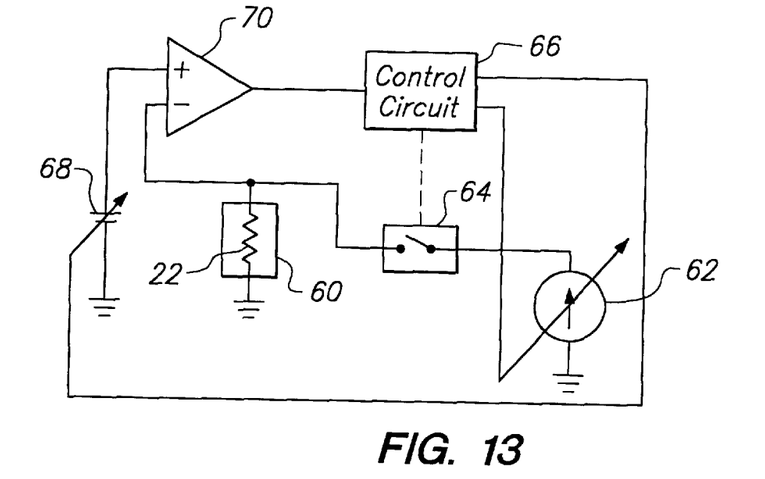
FIG. 13 is a block diagram of a resistance matching circuit according to the present invention.
Figure 14:
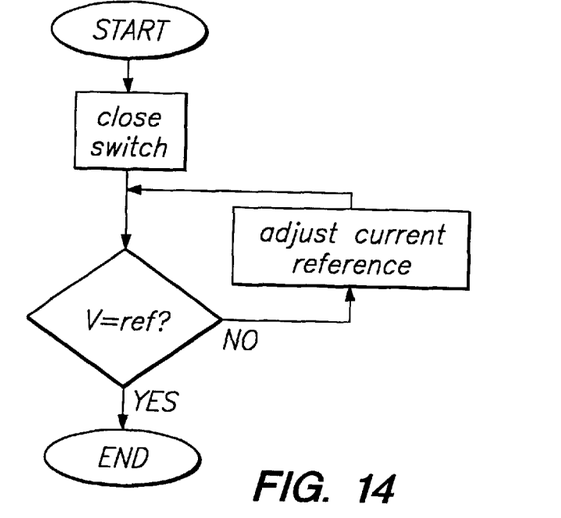
FIG. 14 is a flow chart of the resistance matching process according to the present invention.

The temperature sensing elements may be matched using the resistance matching circuit illustrated in FIG. 13 and the resistance matching process of FIG. 14. The temperature sensing elements are preferably matched after they have been mounted on the posts but before the enclosure has been completely enclosed. According to the resistance matching circuit of FIG. 13, the temperature sensing wires 22, 24 are placed in an oxygen rich environment 60 and connected to a current source 62 through a switch 64. The switch 64 and the current source 62 are controlled by a control circuit 66 which may be either analog, digital, or a computer controlled circuit. When the switch 64 is closed, a current which is sufficient to cause oxidation is applied to a temperature sensing element 22 which is in the oxidizing atmosphere. The oxidation causes the resistance of the element to increase until a predetermined reference voltage is reached. The predetermined reference voltage is set by a reference voltage source 68 according to a signal of the control circuit 66. A comparator 70 is used to determine when the resistance of the temperature sensing element has reached the desired resistance and the control circuit operates the switch 64 to stop the oxidation with great accuracy. If the comparator 70 determines that the element has not reach the desired resistance, the control device 66 may increase the current supplied by the current source 62 until the desired resistance is achieved.

The process for matching the resistances is illustrated in the flow chart of FIG. 14. As shown in FIG. 14, the reference voltage 68 is adjusted until the resistance of the sensing element is increased to the desired degree. The resistance of the temperature sensing elements can be achieved with great accuracy using commercially available instruments. The desired resistance is preferably set so that the increase in the resistance of the elements due to oxidation over the pre-oxidation resistance is less than 10%.

One advantage of matching the resistances of the temperature sensing elements is the elimination of the necessity for bridge balancing, for example, by the trim pot in the circuit shown in FIG. 2. Another advantage of the resistance matching process is that the oxidation of the elements provides a metallurgical annealing which relieves stress in the elements and contributes to long term stability of the resistance value. A further advantage to matching the elements is that a well match pair of accelerometers can be made which will cancel out the effects of non-turn G loads when the pair of accelerometers are used for determining rate of turn in the system discussed above.

While the invention has been described in detail with reference to a preferred embodiment thereof, it will be apparent to one skilled in the art that various changes can be made, and equivalents employed without departing from the spirit and scope of the invention.

What is claimed is:

1. A vehicle information system for providing information about acceleration or tilt of an automobile comprising:

an enclosure containing a fluid mounted on a vehicle body;

heating means for heating the fluid in the enclosure;

two substantially parallel first temperature sensing elements positioned within the enclosure such that the fluid moves across the two first temperature sensing elements providing first output signals which are representative of the respective temperatures of the two first temperature sensing elements; and circuit means for receiving the first output signals and providing an accelerometer output signal representative of the acceleration or tilt of the vehicle, wherein the heating means is provided by the first temperature sensing elements.

2. The vehicle information system according to claim 1, wherein the acceleration output signal is provided to a navigation system of a vehicle for use in determining a current location of the vehicle.

3. The vehicle information system according to claim 1, wherein the acceleration output signal is provided to an anti-lock braking system for determining a brake application cycle.

4. The vehicle information system according to claim 1, wherein the accelerometer output signal is used to calculate vehicle speed.

5. The vehicle information system according claim 1, wherein the acceleration output signal is provided to an air bag deployment system for arming the air bag when deceleration of the vehicle reaches a predetermined level.

6. The vehicle information system according to claim 1, wherein the accelerometer output signal is provided to an instrumentation system which provides an indication to a driver of excessive turn speed or tilt of the automobile.

7. The vehicle information system of claim 1, further comprising two second temperature sensing elements positioned perpendicular to the two first temperature sensing elements, the two second temperature sensing elements providing second output signals which are representative of the respective temperatures of the two second temperature sensing elements.

8. The vehicle information system of claim 7, wherein the circuit means receives the second output signals and provides an accelerometer signal representative of the acceleration, deceleration, or inclination of the vehicle in two dimensions.

9. The vehicle information system of claim 7, wherein the two second temperature sensing elements are positioned within the enclosure in a plane which is parallel to the plane passing through the two first temperature sensing elements.

10. A method of controlling a vehicle comprising:

mounting an accelerometer in a vehicle, the accelerometer including an enclosure containing a fluid, and two substantially parallel heating and temperature sensing elements within the enclosure;

heating the fluid with the two substantially parallel heating and temperature sensing elements;

sensing a temperature difference between the two heating and temperature sensing elements within the enclosure caused by changes in free convection of the fluid within the enclosure due to acceleration or inclination of the vehicle;

determining an acceleration or inclination of the vehicle based on the sensed temperature difference; and controlling a vehicle control or sensing system in accordance with the determined acceleration or inclination.

\* \* \* \* \*